(12) United States Patent
Yoshizaki

(10) Patent No.: US 11,959,416 B1
(45) Date of Patent: Apr. 16, 2024

(54) ENGINE

(71) Applicant: TOYOTA JIDOSHA KABUSHIKI KAISHA, Toyota (JP)

(72) Inventor: Yuto Yoshizaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/488,037

(22) Filed: Oct. 17, 2023

(30) Foreign Application Priority Data

Oct. 28, 2022 (JP) ................................. 2022-173413

(51) Int. Cl.
  *F02B 77/13* (2006.01)
  *H02G 3/04* (2006.01)
  *H03G 3/04* (2006.01)

(52) U.S. Cl.
  CPC ........... *F02B 77/13* (2013.01); *H02G 3/0437* (2013.01)

(58) Field of Classification Search
  CPC ....... F02B 77/13; H02G 3/0437; B60R 16/02; G10K 11/16
  See application file for complete search history.

(56) References Cited

U.S. PATENT DOCUMENTS

| 2003/0019461 | A1* | 1/2003 | Yasuda | .................... | F02F 7/006 |
| | | | | | 123/195 C |
| 2015/0075482 | A1* | 3/2015 | Kondo | .................. | F16B 21/073 |
| | | | | | 123/198 E |
| 2018/0003108 | A1* | 1/2018 | Fujimura | ................ | F02B 77/11 |
| 2023/0220798 | A1* | 7/2023 | Tamegai | ................ | F02M 39/02 |
| | | | | | 181/204 |

FOREIGN PATENT DOCUMENTS

| JP | 2001020753 A | 1/2001 |
| JP | 2014109624 A | 6/2014 |

* cited by examiner

*Primary Examiner* — Phutthiwat Wongwian
*Assistant Examiner* — Arnold Castro

(57) ABSTRACT

An engine includes a cylinder head, a wire assembly including multiple wire harnesses and a protector that holds the wire harnesses together, a sound absorber, and an engine cover. The engine cover is attached to the cylinder head in a state in which the wire assembly and the sound absorber are held between the cylinder head and the engine cover to elastically deform the sound absorber. The protector is held in a state of being pressed against the cylinder head by a restoring force of the sound absorber. The sound absorber includes a contact region pressed against the protector. The sound absorber includes an engagement portion located at an edge of the contact region. The engagement portion is thicker than the thickness of the contact region. The engagement portion is adjacent to a side surface of the protector.

5 Claims, 6 Drawing Sheets

ENGINE

BACKGROUND

1. Field

The present disclosure relates to an engine.

2. Description of Related Art

Japanese Laid-Open Patent Publication No. 2001-020753 discloses an engine. This engine includes a sound absorber made of urethane foam that fills the space between the engine cover attached to the cylinder head and the intake ports. The sound absorber includes a groove into which a wire harness is fitted. When routed, the wire harness is fitted into the groove.

The groove of the sound absorber in the above-described configuration is formed into a shape that follows the routing path of the wire harness. When routing the wire harness, the wire harness needs to be fitted into the groove of the sound absorber.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an engine includes a cylinder head, a wire assembly, a sound absorber, and an engine cover. The wire assembly includes multiple wire harnesses and a protector. The protector holds the wire harnesses such that the wire harnesses have shapes suitable to be routed. The engine cover covers the wire assembly and the sound absorber arranged on the cylinder head. The engine cover is attached to the cylinder head in a state in which the wire assembly and the sound absorber are held between the cylinder head and the engine cover to elastically deform the sound absorber. The protector is held in a state of being pressed against the cylinder head by a restoring force of the sound absorber. The sound absorber includes a contact region pressed against the protector. The sound absorber includes an engagement portion located at an edge of the contact region, the engagement portion being thicker than a thickness of the contact region. The engagement portion is adjacent to a side surface of the protector.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An engine 100 according to one embodiment will now be described with reference to FIGS. 1 to 12.

Structure of Engine 100

Figure 1:
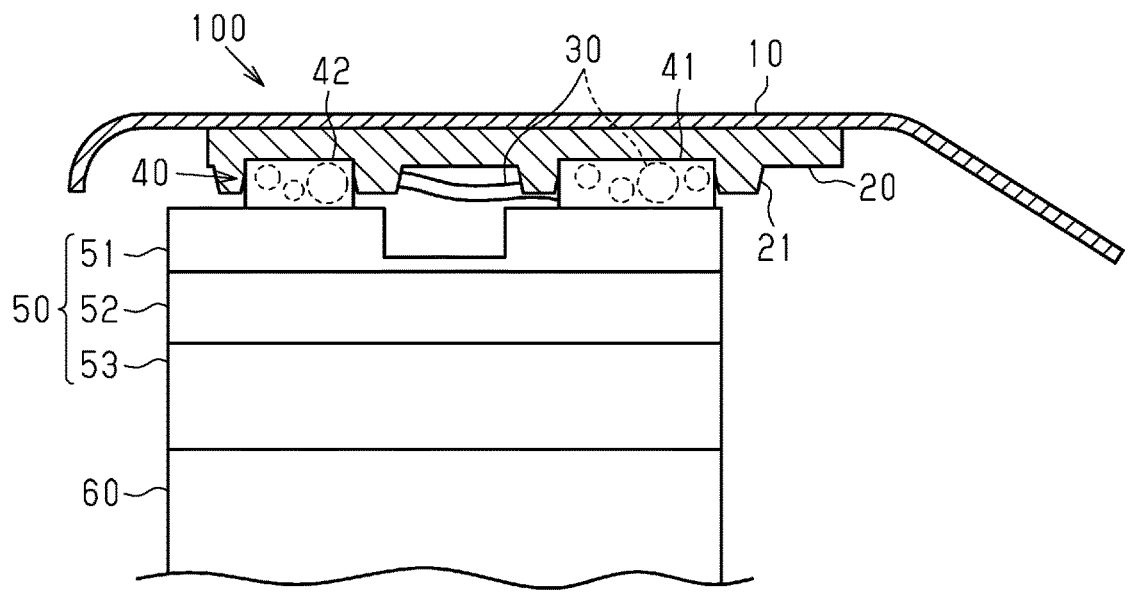
FIG. 1 is a schematic diagram showing an engine according to an embodiment to which an engine cover is attached.

As shown in FIG. 1, an engine cover 10 is attached to a cylinder head 50 of the engine 100. The cylinder head 50 includes a head cover 51, a camshaft housing 52, and a cylinder head main body 53. The cylinder head main body 53 is combined with a cylinder block 60 to define combustion chambers. The camshaft housing 52 is attached to the cylinder head main body 53 to support an intake camshaft and an exhaust camshaft. The head cover 51 is attached to the camshaft housing 52 to seal the cam chamber.

Various types of electrical components such as sensors and electric valves are attached to the engine 100. These electrical components are each connected to a wire harness 30. The wire harness 30 includes bundled electric wires. Some of the electric wires are used to perform signal communication between an electrical component and a controller. Other electric wires are used to supply power to the electrical component. A wire assembly 40 is attached to the cylinder head 50 of the engine 100.

Figure 2:
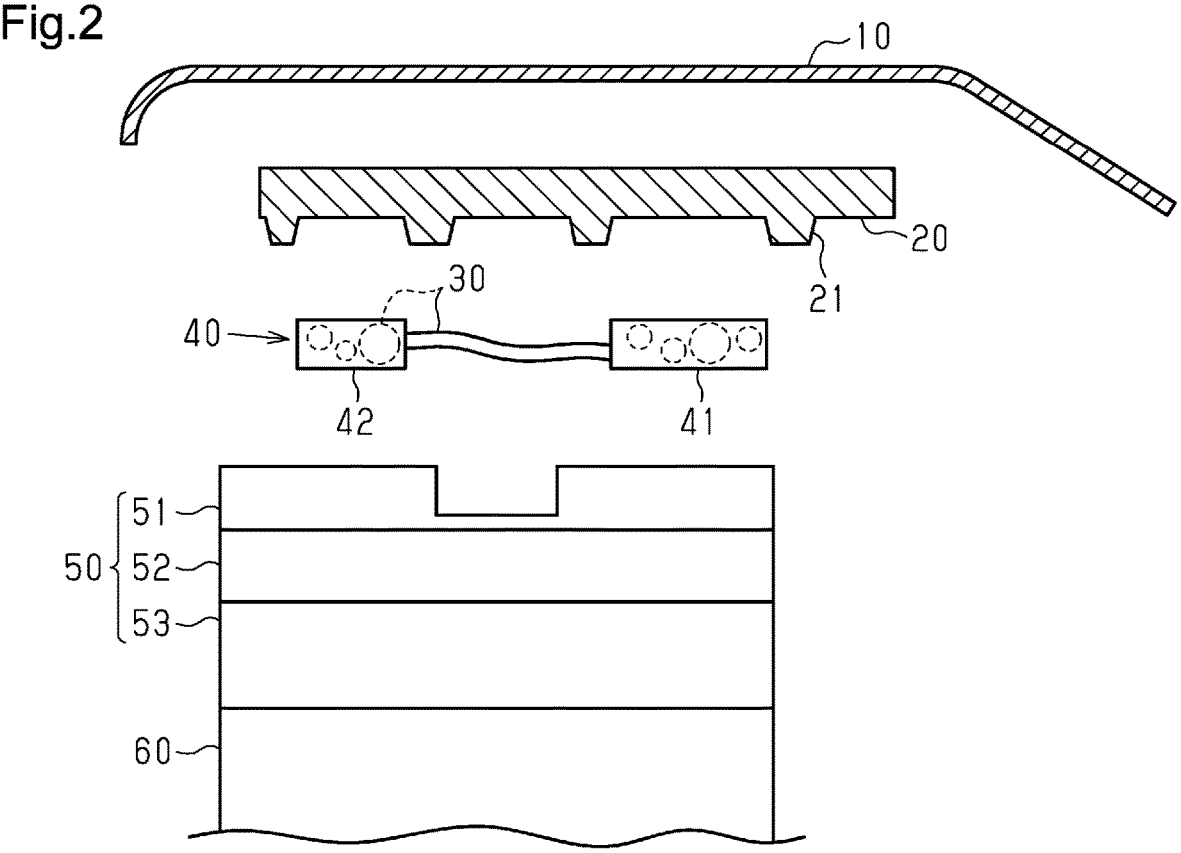
FIG. 2 is an exploded diagram separately showing the engine cover, a sound absorber, and a wire assembly attached to the cylinder head of FIG. 1.

As shown in FIG. 2, the wire assembly 40 includes multiple wire harnesses 30, a first protector 41, and a second protector 42. The first protector 41 and the second protector 42 hold the wire harnesses 30 such that the wire harnesses 30 have shapes suitable to be routed.

As shown in FIG. 1, the wire assembly 40 is attached to the top of the cylinder head by fixing the first protector 41 and the second protector 42 to the head cover 51. A sound absorber 20 is held between the wire assembly 40 and the engine cover 10. The sound absorber 20 is made, for example, by molding urethane foam. The sound absorber 20 may be made by molding other materials. For example, the sound absorber 20 may be made by molding ethylene propylene rubber sponge.

The engine cover 10 is attached to the cylinder head 50 so as to cover the wire assembly 40 and the sound absorber 20 arranged on the cylinder head 50. The engine cover 10 is attached to the cylinder head 50 in a state in which the sound absorber 20 and the wire assembly 40 are held between the cylinder head 50 and the engine cover 10 so as to elastically deform the sound absorber 20.

Structure of Cylinder Head 50

Figure 3:
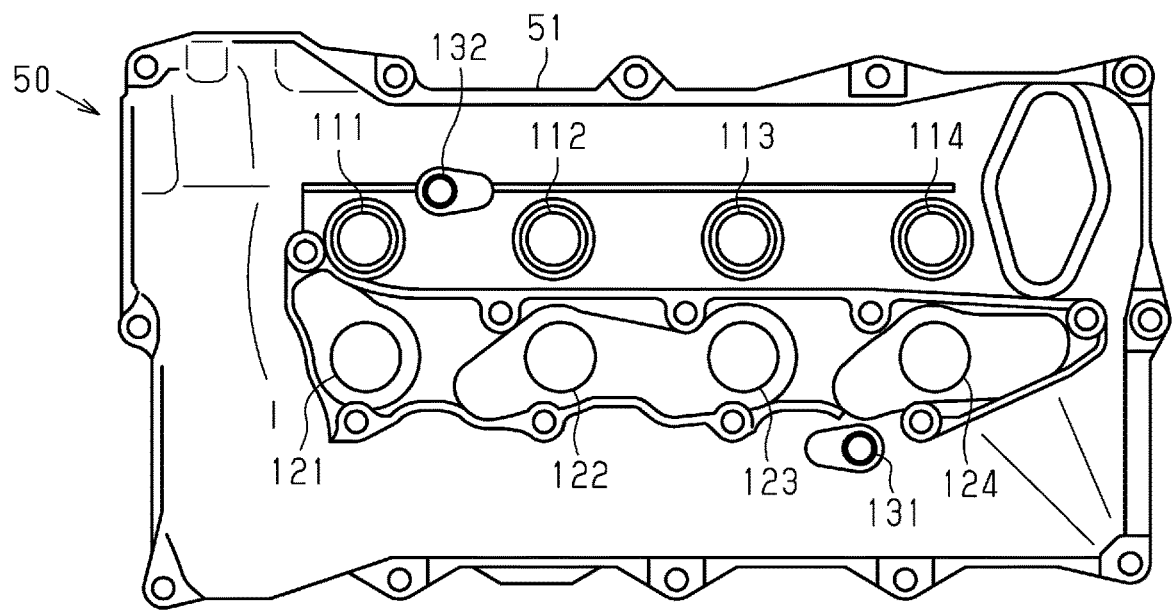
FIG. 3 is a top view of the cylinder head shown in FIG. 1 without a wire harness.

The structure of the upper surface of the cylinder head 50, to which the wire assembly 40 is attached, will now be described with reference to FIG. 3. FIG. 3 is a diagram showing the upper surface of the head cover 51, which forms the upper surface of the cylinder head 50. The engine 100 is an in-line four-cylinder engine including four cylinders, namely, first to fourth cylinders. In the engine 100, the first, second, third, and fourth cylinders are arranged in that order from the left side in FIG. 3.

As shown in FIG. 3, a first ignition coil 111, a second ignition coil 112, a third ignition coil 113, and a fourth ignition coil 114 are attached to the cylinder head 50. The first ignition coil 111 is connected to an ignition plug of the first cylinder. The second ignition coil 112 is connected to an ignition plug of the second cylinder. The third ignition coil 113 is connected to an ignition plug of the third cylinder. The fourth ignition coil 114 is connected to an ignition plug of the fourth cylinder.

A first injector 121, a second injector 122, a third injector 123, and a fourth injector 124 are attached to the cylinder head 50. The first injector 121 injects fuel into the first cylinder. The second injector 122 injects fuel into the second cylinder. The third injector 123 injects fuel into the third cylinder. The fourth injector 124 injects fuel into the fourth cylinder.

As shown in FIG. 3, an intake cam position sensor 131 and an exhaust cam position sensor 132 are attached to the cylinder head 50. The intake cam position sensor 131 detects a rotational phase of the intake camshaft. The exhaust cam position sensor 132 detects a rotational phase of the exhaust camshaft.

Structure of Wire Assembly 40

Figure 4:
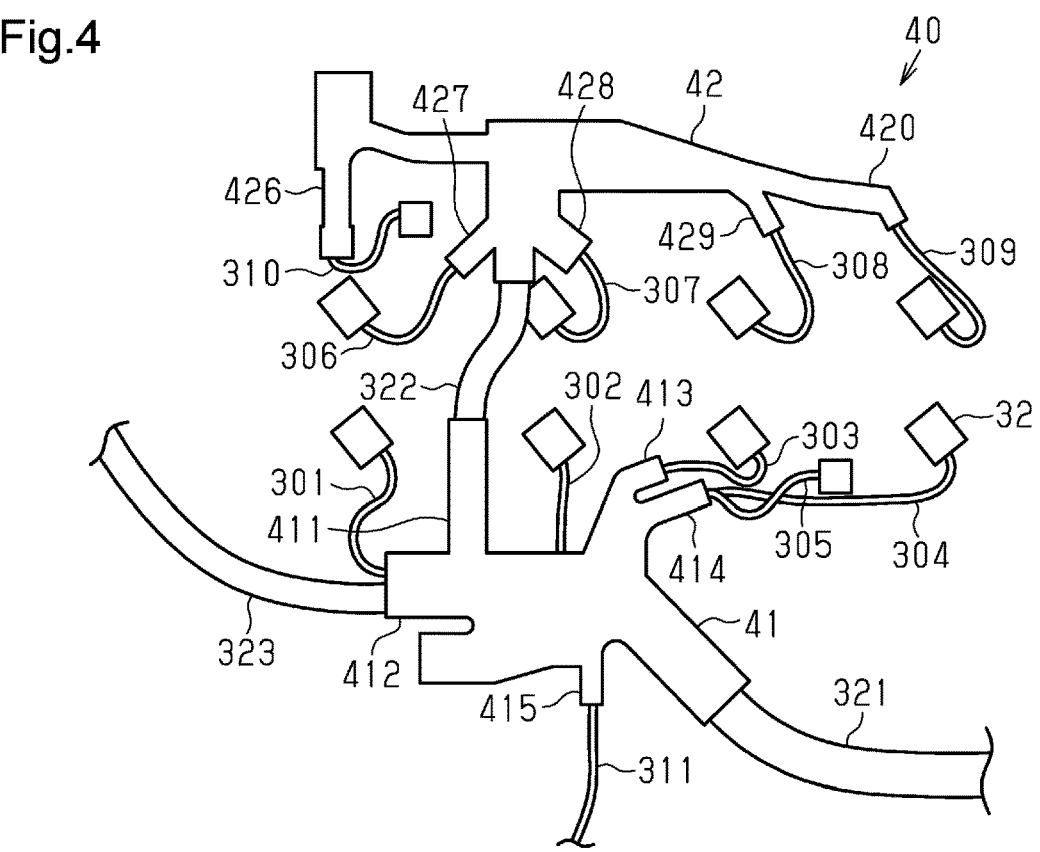
FIG. 4 is a top view of the wire assembly shown in FIG. 1.
Figure 5:
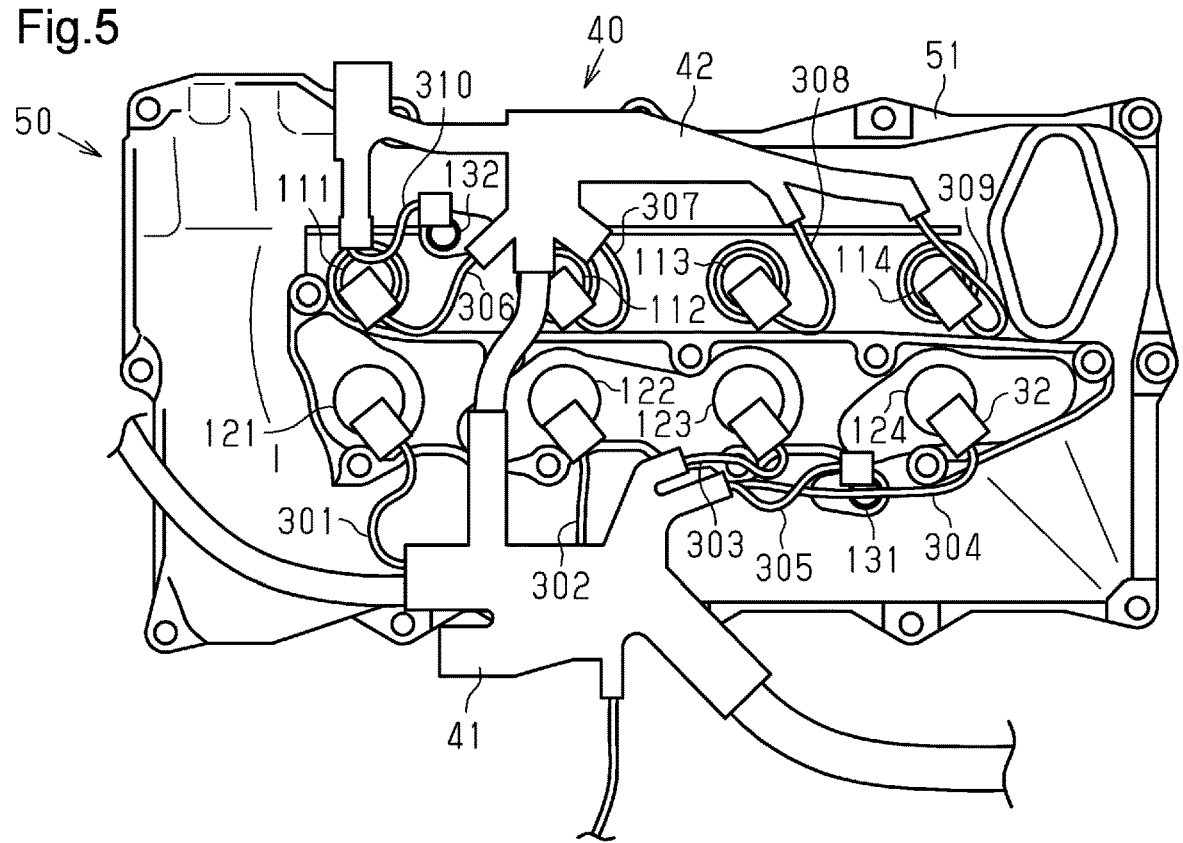
FIG. 5 is a top view of the cylinder head shown in FIG. 3 with the wire harness attached.

The structure of the wire assembly 40 will now be described. FIG. 4 is a top view of the wire assembly 40. FIG. 5 is a top view of the cylinder head 50 to which the wire assembly 40 is attached.

As shown in FIG. 4, the wire assembly 40 includes the first protector 41 and the second protector 42. The first protector 41 and the second protector 42 are plastic cases that hold the wire harnesses 30.

As shown in FIG. 4, the first protector 41 holds a first trunk cable 321, which is formed by bundling the wire harnesses 30 including a first branch wire 301 to an eleventh branch wire 311. The bundle of the wire harnesses 30 is coated with a protective material such as a corrugated tube. The first trunk cable 321 is branched into multiple branch wires and multiple trunk cables in the first protector 41. The first protector 41 includes a first branch pipe 411, a second branch pipe 412, a third branch pipe 413, a fourth branch pipe 414, and a fifth branch pipe 415, which guide the branch wires and the trunk cables.

As shown in FIG. 4, the first branch pipe 411 is a branch pipe that guides a second trunk cable 322. The second trunk cable 322, which extends out of the first protector 41 from the first branch pipe 411, is held by the second protector 42. The second trunk cable 322 is formed by bundling the wire harnesses 30 including the sixth branch wire 306 to the tenth branch wire 310.

The second trunk cable 322 is branched into the sixth branch wire 306 to the tenth branch wire 310 in the second protector 42. The second protector 42 includes five branch pipes that respectively guide these five branch wires.

The second branch pipe 412 of the first protector 41 is a branch pipe that guides a third trunk cable 323 and the first branch wire 301. The third trunk cable 323, which extends out of the first protector 41 from the second branch pipe 412, is formed by bundling branch wires that are connected to electrical components attached to the cylinder block 60. The third trunk cable 323 extends toward the cylinder block 60. As shown in FIG. 4, the first branch wire 301, which extends out of the first protector 41 from the second branch pipe 412, is the wire harness 30 connected to the first injector 121. As shown in FIG. 5, a connector 32 of the first branch wire 301 is connected to the first injector 121.

The first protector 41 includes a hole in a side surface, through which the second branch wire 302 is drawn out. As shown in FIG. 4, the second branch wire 302 extends out of the first protector 41 through the hole. The second branch wire 302, which extends out of the first protector 41, is the wire harness 30 connected to the second injector 122. As shown in FIG. 5, a connector 32 of the second branch wire 302 is connected to the second injector 122.

As shown in FIG. 4, the third branch pipe 413 is a branch pipe that guides the third branch wire 303. The third branch wire 303, which extends out of the first protector 41 from the third branch pipe 413, is the wire harness 30 connected to the third injector 123. As shown in FIG. 5, a connector 32 of the third branch wire 303 is connected to the third injector 123.

As shown in FIG. 4, the fourth branch pipe 414 is a branch pipe that guides the fourth branch wire 304 and the fifth branch wire 305. The fourth branch wire 304, which extends out of the first protector 41 from the fourth branch pipe 414, is the wire harness 30 connected the fourth injector 124. The fifth branch wire 305, which extends out of the first protector 41 from the fourth branch pipe 414, is the wire harness 30 connected to the intake cam position sensor 131. As shown in FIG. 5, a connector 32 of the fourth branch wire 304 is connected to the fourth injector 124. A connector 32 of the fifth branch wire 305 is connected to the intake cam position sensor 131.

As shown in FIG. 4, the fifth branch pipe 415 is a branch pipe that guides the eleventh branch wire 311. The eleventh branch wire 311, which extends out of the first protector 41 from the fifth branch pipe 415, is the wire harness 30 connected to, for example, an intake pressure sensor attached to the intake manifold.

As shown in FIG. 4, the sixth branch pipe 426 is a branch pipe that guides the tenth branch wire 310. The tenth branch wire 310, which extends out of the second protector 42 from the sixth branch pipe 426, is the wire harness 30 connected to the exhaust cam position sensor 132. As shown in FIG. 5, a connector 32 of the tenth branch wire 310 is connected to the exhaust cam position sensor 132.

As shown in FIG. 4, the seventh branch pipe 427 is a branch pipe that guides the sixth branch wire 306. The sixth branch wire 306, which extends out of the second protector 42 from the seventh branch pipe 427, is the wire harness 30 connected to the first ignition coil 111. As shown in FIG. 5, a connector 32 of the sixth branch wire 306 is connected to the first ignition coil 111.

As shown in FIG. 4, the eighth branch pipe 428 is a branch pipe that guides the seventh branch wire 307. The seventh branch wire 307, which extends out of the second protector 42 from the eighth branch pipe 428, is the wire harness 30 connected to the second ignition coil 112. As shown in FIG. 5, a connector 32 of the seventh branch wire 307 is connected to the second ignition coil 112.

As shown in FIG. 4, the ninth branch pipe 429 is a branch pipe that guides the eighth branch wire 308. The eighth branch wire 308, which extends out of the second protector 42 from the ninth branch pipe 429, is the wire harness 30 connected to the third ignition coil 113. As shown in FIG. 5, a connector 32 of the eighth branch wire 308 is connected to the third ignition coil 113.

As shown in FIG. 4, the tenth branch pipe 420 is a branch pipe that guides the ninth branch wire 309. The ninth branch wire 309, which extends out of the second protector 42 from the tenth branch pipe 420, is the wire harness 30 connected to the fourth ignition coil 114. As shown in FIG. 5, a connector 32 of the ninth branch wire 309 is connected to the fourth ignition coil 114.

Figure 6:
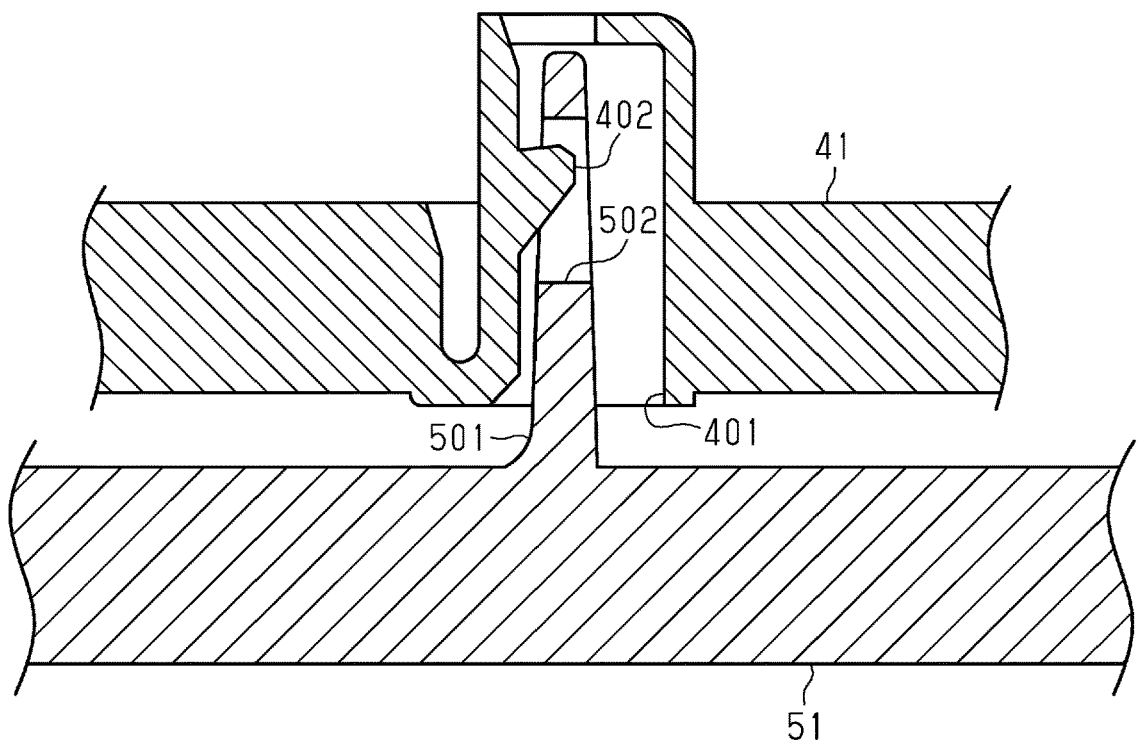
FIG. 6 is a cross-sectional view of a part in which a protector and the cylinder head shown in FIG. 5 are coupled to each other.

The wire assembly 40 is coupled to the head cover 51 by snap-fitting. For example, as shown in FIG. 6, the head cover 51 includes one or more locking lugs 501 on the upper surface. Each locking lug 501 has a locking hole 502. The first protector 41 includes one or more insertion grooves 401 in the lower surface, into which the locking lugs 501 are inserted, respectively. Each insertion groove 401 is provided with a hook 402. When each locking lug 501 is inserted into the corresponding insertion groove 401, the hook 402 is elastically deformed, so that the hook 402 enters the locking hole 502 of the locking lug 501. When the hook 402 is engaged with the locking lug 501, the locking lug 501 is prevented from lifting off the insertion groove 401. Taking into consideration the manufacturing tolerances, the locking hole 502 is larger than the dimension of the hook 402.

The cylinder head 50 includes multiple locking lugs 501. The first protector 41 and the second protector 42 each include multiple insertion grooves 401, into which the locking lugs 501 are inserted, respectively. The first protector 41 and the second protector 42 are coupled to the cylinder head 50 through snap-fitting in which the locking lugs 501 are inserted into the insertion grooves 401.

As shown in FIG. 5, the wire harnesses 30, which are held by the protectors 41, 42, are respectively guided by the corresponding branch pipes of the protectors 41, 42 to positions near the electrical components to be connected. In other words, in the wire assembly 40, the wire harnesses 30 are held by the protectors 41 and 42 to have shapes suitable to be routed. In the engine 100, the wire assembly 40 facilitates routing of the wire harnesses 30.

Structure of Sound Absorber 20

Figure 7:
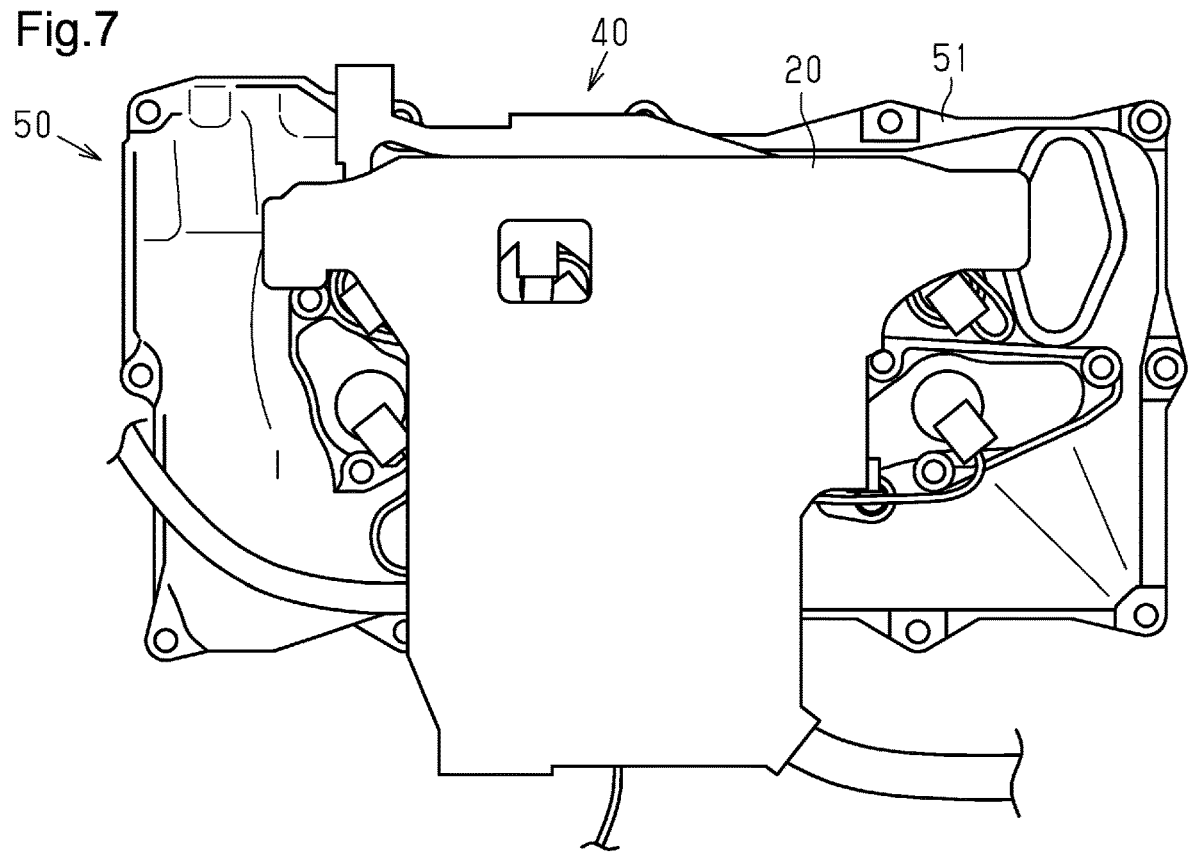
FIG. 7 is a top view of the cylinder head shown in FIG. 3 covered with the sound absorber.

As shown in FIG. 7, the sound absorber 20 is placed over the cylinder head 50, to which the wire assembly 40 is attached, from above the wire assembly 40.

Figure 8:
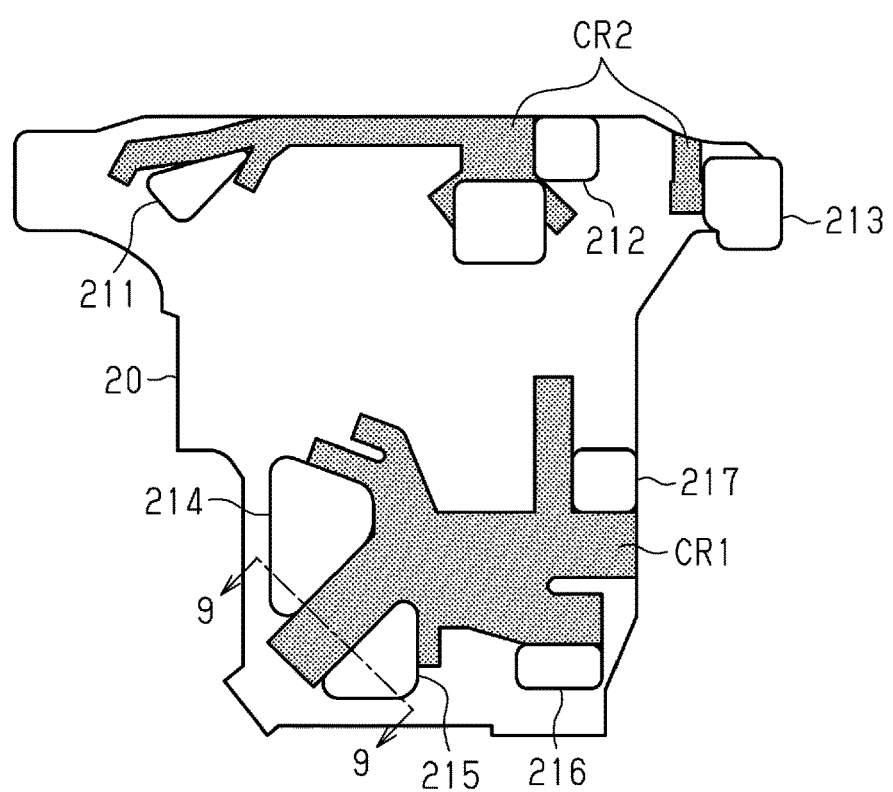
FIG. 8 is a diagram showing the back surface of the sound absorber shown in FIG. 7.

FIG. 8 is a bottom view of the sound absorber 20, showing the shape of the back surface of the sound absorber 20. FIG. 8 shows a portion of the sound absorber 20 that is brought into contact with the upper surface of the first protector 41 as a first contact region CR1. Also, FIG. 8 shows a portion of the sound absorber 20 that is brought into contact with the upper surface of the second protector 42 as a second contact region CR2. The sound absorber 20 includes seven engagement portions 21 at edges of the contact regions CR1, CR2. The seven engagement portions 21 include a first engagement portion 211, a second engagement portion 212, a third engagement portion 213, a fourth engagement portion 214, a fifth engagement portion 215, a sixth engagement portion 216, and a seventh engagement portion 217. The first engagement portion 211 to the third engagement portion 213 are provided at edges of the second contact region CR2. The fourth engagement portion 214 to the seventh engagement portion 217 are provided at edges of the first contact region CR1.

A thickness Th2 of the engagement portions 211 to 217 is greater than a thickness Th1 of the sound absorber 20 in the contact regions CR1, CR2. That is, the sound absorber 20 includes the engagement portions 21, which are located at edges of the contact regions CR1, CR2 and thicker than the thickness Th1 of the contact regions CR1, CR2. For example, as shown in FIG. 9, the thickness Th2 of the fourth engagement portion 214 and the fifth engagement portion 215 is greater than the thickness Th1 of the first contact region CR1, which is brought into contact with the first protector 41.

Figure 9:
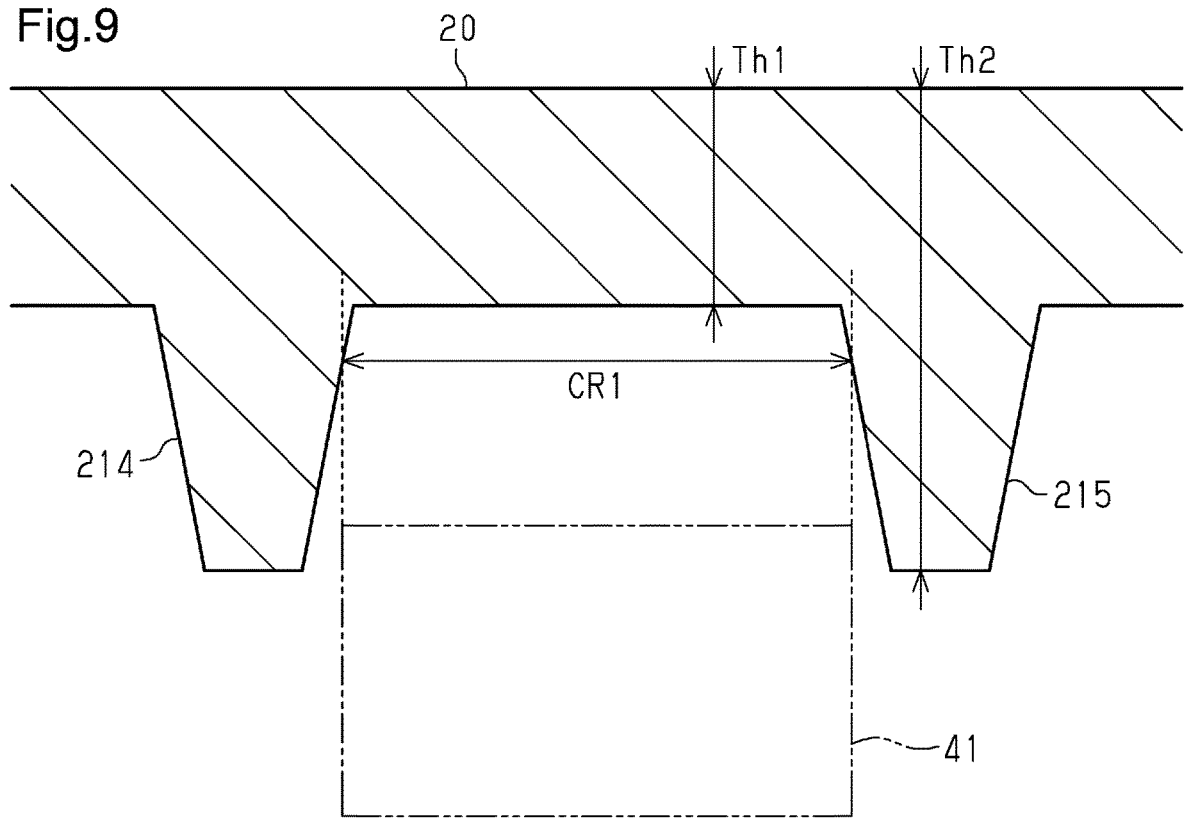
FIG. 9 is a cross-sectional view taken along line 9-9 of FIG. 8.

As shown in FIG. 9, the widths of the fourth engagement portion 214 and the fifth engagement portion 215 increase toward the proximal ends. Accordingly, the part of the fourth engagement portion 214 that is connected to the first contact region CR1 has an inclined surface, which is inclined such that the thickness of the connected part decreases toward the first contact region CR1. The part of the fifth engagement portion 215 that is connected to the first contact region CR1 has an inclined surface that is inclined such that the thickness of the connected part decreases toward the first contact region CR1.

As shown in FIG. 9, the distance between the distal end of the fourth engagement portion 214 and the distal end of the fifth engagement portion 215 is greater than the width of the first protector 41. The width of the part having the thickness Th1 in the first contact region CR1 is slightly smaller than the width of the first protector 41. Thus, the inclined surfaces of the sound absorber 20 are brought into contact with the first protector 41 simply by placing the sound absorber 20 over the first protector 41 after roughly adjusting the position of the first protector 41 so that the first protector 41 is located between the distal end of the fourth engagement portion 214 and the distal end of the fifth engagement portion 215. The sound absorber 20 is guided by the inclined surfaces such that the first contact region CR1 comes into contact with the first protector 41.

The engagement portions 211 to 217 have similar inclined surfaces. Thus, when the sound absorber 20 is placed over the wire assembly 40, the inclined surfaces of the engagement portions 211 to 213 come into contact with the second protector 42, and the inclined surfaces of the engagement portions 214 to 217 come into contact with the first protector 41.

Figure 10:
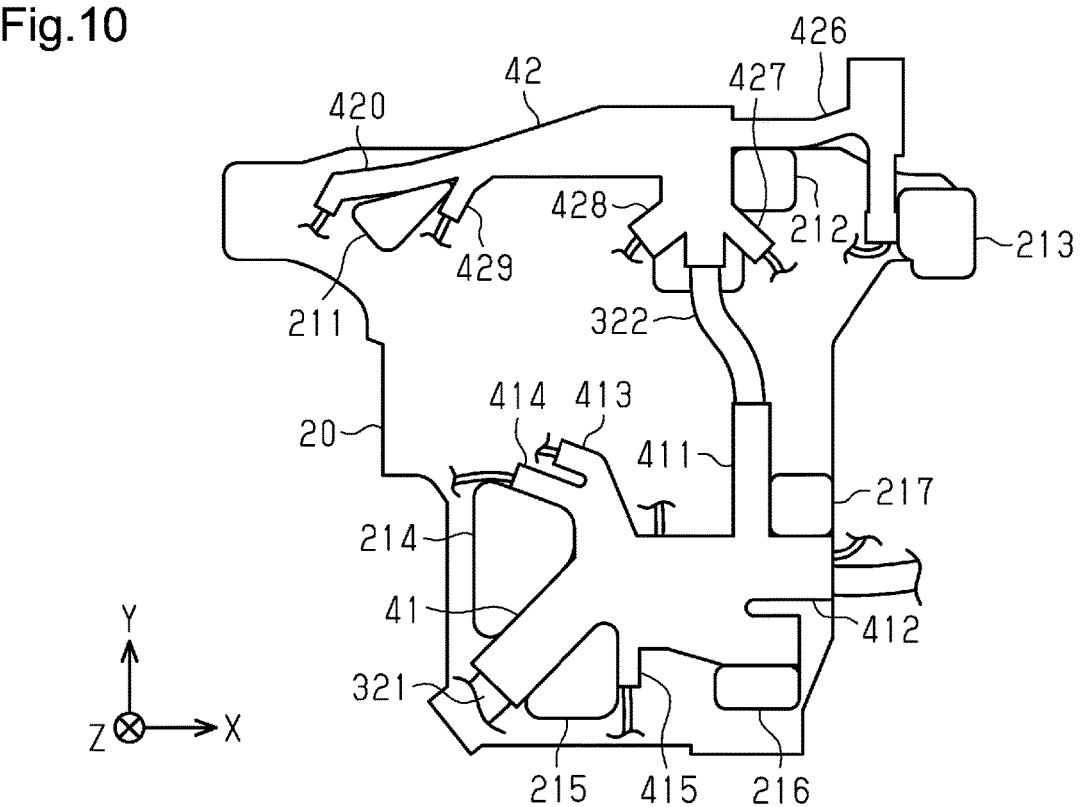
FIG. 10 is a diagram showing a state in which the wire assembly and the sound absorber shown in FIG. 4 are combined.

FIG. 10 is a bottom view of the sound absorber 20 in a state in which the sound absorber 20 is placed over the wire assembly 40 to combine the sound absorber 20 with the wire assembly 40.

As shown in FIG. 10, the first engagement portion 211 is adjacent to a part at which the ninth branch pipe 429 and the tenth branch pipe 420 branch off from each other. That is, the first engagement portion 211 is provided at a position adjacent to a part of the second protector 42 at which a side surface of the ninth branch pipe 429 and a side surface of the tenth branch pipe 420 are connected to each other. Thus, the first engagement portion 211 is adjacent to both the ninth branch pipe 429 and the tenth branch pipe 420. The second engagement portion 212 is adjacent to a part of the second protector 42 to which the base of the sixth branch pipe 426 is connected. Accordingly, the second engagement portion 212 is arranged at a position adjacent to a part at which side surfaces of the second protector 42 are connected to each other. The third engagement portion 213 is adjacent to the distal end of the sixth branch pipe 426. That is, the third engagement portion 213 is also adjacent to a side surface of the second protector 42.

As shown in FIG. 10, the first engagement portion 211 and the third engagement portion 213 are arranged on opposite sides of the second protector 42. The first engagement portion 211 and the second engagement portion 212 are also arranged on opposite sides of the second protector 42.

As shown in FIG. 10, the fourth engagement portion 214 is adjacent to a part of the first protector 41 at which the part holding the first trunk cable 321 and the fourth branch pipe 414 are branched off from each other. That is, the fourth engagement portion 214 is arranged at a position adjacent to a part of the first protector 41 at which side surfaces are connected to each other. The fifth engagement portion 215 is adjacent to a part of the first protector 41 at which the part holding the first trunk cable 321 and the fifth branch pipe 415 are branched off from each other. That is, the fifth engagement portion 215 is arranged at a position adjacent to a part of the first protector 41 at which side surfaces are connected to each other. The seventh engagement portion 217 is adjacent to a part of the first protector 41 at which the first branch pipe 411 and the second branch pipe 412 branch off from each other. That is, the seventh engagement portion 217 is provided at a position adjacent to a part of the first protector 41 at which a side surface of the first branch pipe 411 and a side surface of the second branch pipe 412 are connected to each other. Thus, the seventh engagement portion 217 is adjacent to both the first branch pipe 411 and the second branch pipe 412.

As shown in FIG. 10, the sixth engagement portion 216 is provided at a position adjacent to a side surface of the first protector 41 such that the sixth engagement portion 216 and the seventh engagement portion 217 are located on opposite sides of the first protector 41. The fourth engagement portion 214 and the fifth engagement portion 215 are arranged on opposite sides of the first protector 41. The fourth engagement portion 214 and the seventh engagement portion 217 are also arranged on opposite sides of the first protector 41. The fifth engagement portion 215 and the seventh engagement portion 217 are also arranged on opposite sides of the first protector 41.

Structure of Engine Cover 10

Figure 11:
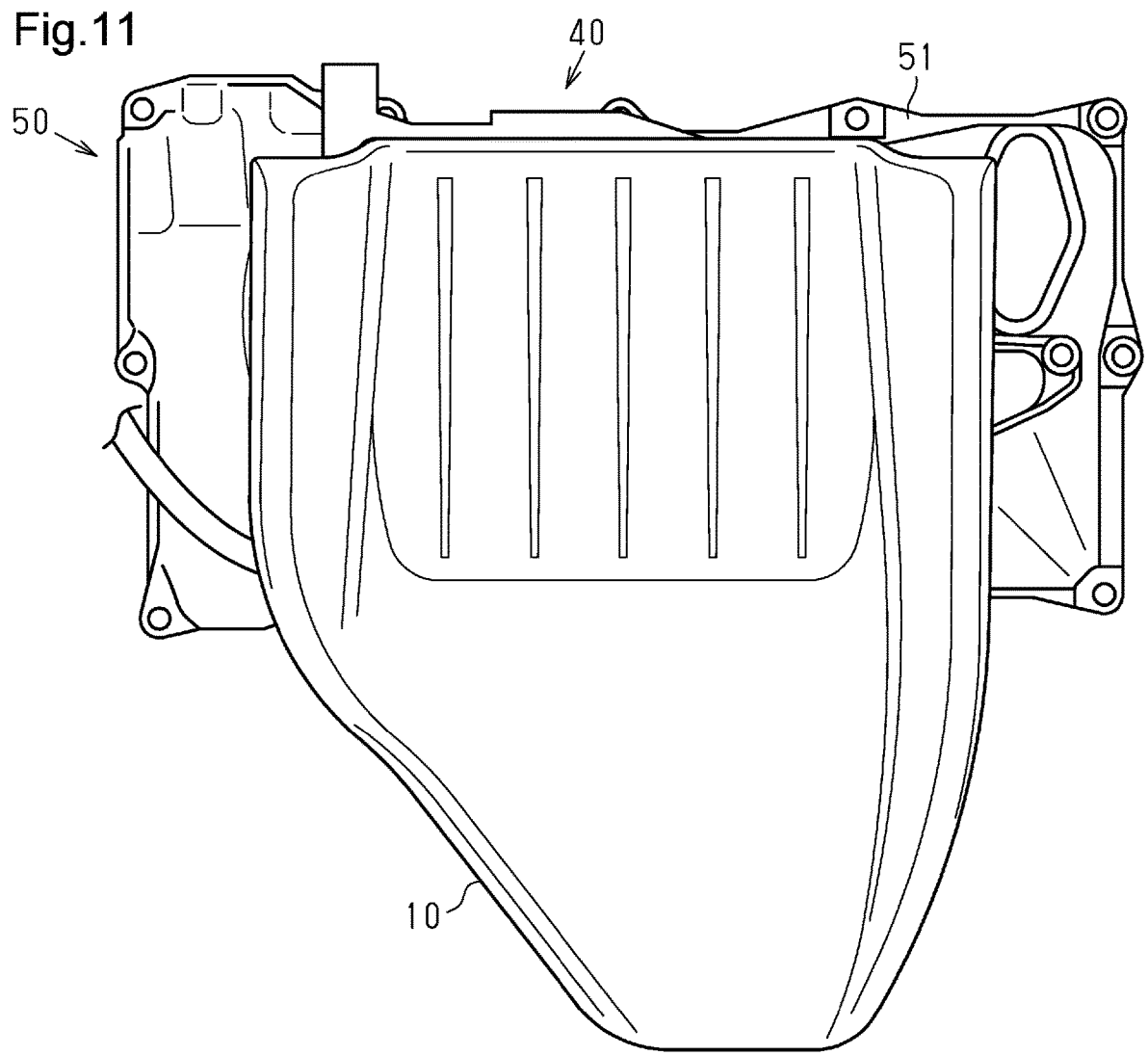
FIG. 11 is a top view of the cylinder head shown in FIG. 7 with the engine cover attached.

The wire assembly 40 is assembled with the sound absorber 20. The sound absorber 20 is placed over the cylinder head 50. The engine cover 10 is attached to the cylinder head 50 as shown in FIG. 11. The engine cover 10 is fixed to the cylinder head 50 in a state of covering the sound absorber 20.

Figure 12:
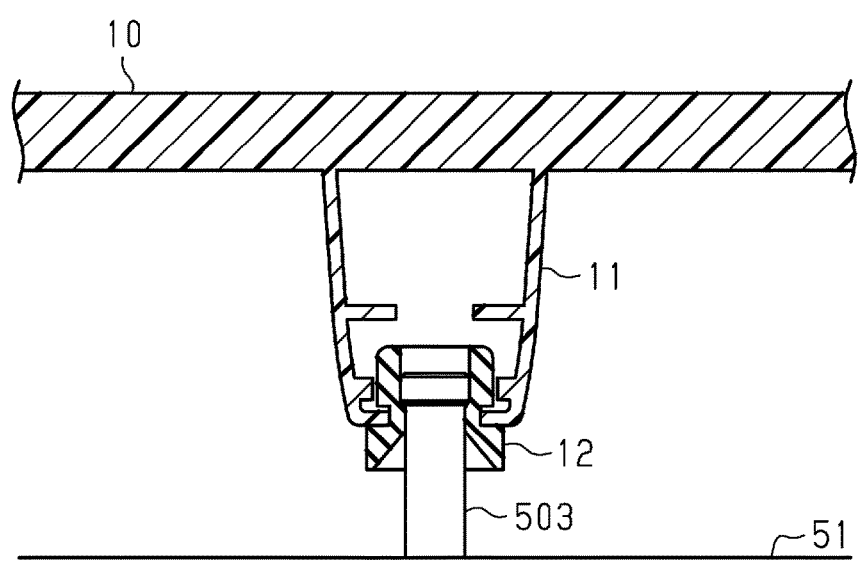
FIG. 12 is a cross-sectional view of a part in which the engine cover and the cylinder head shown in FIG. 11 are coupled to each other.

As shown in FIG. 12, the engine cover 10 includes multiple pillars 11 on the back surface. An annular rubber bushing 12 is attached to the distal end of each pillar 11. The head cover 51 includes multiple pins 503 configured to be respectively inserted into the corresponding rubber bushings 12. The intake manifold is also provided with similar pins 503. The engine cover 10 is coupled to the cylinder head 50 by inserting the pins 503 into the rubber bushings 12.

Operation of Present Embodiment

When the pins 503 are inserted into the rubber bushings 12, the sound absorber 20, which is held between the wire assembly 40 and the engine cover 10, is elastically deformed. Accordingly, the first contact region CR1 of the sound absorber 20 comes into contact with the first protector 41, and the second contact region CR2 comes into contact with the second protector 42. Consequently, as shown in FIG. 1, the protectors 41, 42 are held in a state of being pressed against the cylinder head 50 by the restoring force of the sound absorber 20.

Further, as shown in FIG. 1, the protectors 41, 42 are supported by the engagement portions 21 from the sides.

Advantages of Present Embodiment (1) In the engine 100, the wire assembly 40, which is formed by bundling the wire harnesses 30 into shapes suitable to be routed, is held by the restoring force of the sound absorber 20 and the engagement with the engagement portions 21. Thus, the wire harnesses 30 can be routed without the need for fitting the wire harnesses 30 into grooves of the sound absorber 20. Further, the wire assembly 40 is held by the restoring force of the sound absorber 20, which is held between the engine cover 10 and the cylinder head 50. As described above with reference to FIG. 6, the dimension of the locking hole 502 in each locking lug 501 is greater than the dimension of the hook 402. Therefore, even if the hooks 402 are respectively inside the locking holes 502, the protectors 41, 42 can be displaced relative to the head cover 51 by an amount corresponding to the gap between the inner surface defining the locking hole 502 and the hook 402. In this regard, the engine 100 uses the restoring force of the sound absorber 20 to press the wire assembly 40 against the cylinder head 50. This suppresses vibrations of the protectors 41, 42 due to displacement in the direction along the Z-axis shown in FIG. 10. Further, the protectors 41, 42 are held by the engagement portions 21 from the sides. This also suppresses vibrations of the protectors 41 and 42 due to displacements along the directions parallel to the X-axis and the Y-axis shown in FIG. 10. In other words, the engine 100 reduces noise, wear, and the like caused by vibrations of the wire assembly 40, while facilitating routing of the wire harnesses 30.

(2) In the engine 100, when the sound absorber 20 is placed over the wire assembly 40 arranged on the cylinder head 50, the protectors 41, 42 come into contact with the inclined surfaces of the engagement portions 21 of the sound absorber 20. The inclined surfaces guide the sound absorber 20 so that the contact regions CR1, CR2 come into contact with the protectors 41, 42. Thus, in the engine 100, the sound absorber 20 is readily arranged at a designed position.

(3) In the engine 100, the inclined surfaces of the engagement portions 21 of the sound absorber 20 are in contact with the protectors 41, 42. Accordingly, the engagement portions 21 are in contact with the side surfaces of the protectors 41, 42. Thus, in the engine 100, the protectors 41, 42 are held from the sides.

(4) As shown in FIG. 10, the sixth engagement portion 216 and the seventh engagement portion 217 are provided at positions adjacent to side surfaces of the first protector 41 to be located on opposite sides of the first protector 41. The sixth engagement portion 216 restricts displacement of the first protector 41 in one direction along the Y-axis shown in FIG. 10. The seventh engagement portion 217 restricts displacement of the first protector 41 in the other direction along the Y-axis. Thus, the sixth engagement portion 216 and the seventh engagement portion 217 restrict displacement of the first protector 41 in the directions along the Y-axis. The fourth engagement portion 214 and the seventh engagement portion 217 are arranged on opposite sides of the first protector 41. The fourth engagement portion 214 restricts displacement of the first protector 41 in one direction along the X-axis shown in FIG. 10. The seventh engagement portion 217 restricts displacement of the first protector 41 in the other direction along the X-axis. Thus, the fourth engagement portion 214 and the seventh engagement portion 217 restrict displacement of the first protector 41 in the directions along the X-axis.

The same applies to the relationship of the second protector 42 to the first engagement portion 211 and the second engagement portion 212, and to the relationship of the second protector 42 to the first engagement portion 211 and the third engagement portion 213. Also, the same applies to the relationship of the first protector 41 to the fourth engagement portion 214 and the fifth engagement portion 215, and to the relationship of the first protector 41 to the fifth engagement portion 215 and the seventh engagement portion 217. That is, in the engine 100, the engagement portions 21 are arranged at edges of the contact regions CR1, CR2 such that the engagement portions 21 are located on opposite sides of the protectors 41, 42. Thus, any two of the engagement portions 21 that are located at opposite sides of one of the protectors 41, 42 restrict movement of the protector 41, 42 in the directions along the line connecting the two engagement portions 21.

(5) As shown in FIG. 10, each of the first engagement portion 211 and the second engagement portion 212 is arranged at a position adjacent to a part of the second protector 42 at which multiple side surfaces are connected. Each of the fourth engagement portion 214, the fifth engagement portion 215, and the seventh engagement portion 217 is arranged at a position adjacent to a part of the first protector 41 at which side surfaces are connected to each other. With this configuration, a single engagement portion 21 faces two side surfaces of each of the protectors 41, 42. Thus, the single engagement portion 21 restricts movement of the protector 41, 42 not only in one direction but also in multiple directions. Further, the engagement portions 21 also restrict displacement of the protectors 41, 42 in a rotational direction about an axis parallel to the Z-axis shown in FIG. 10.

Modifications

The above-described embodiment may be modified as follows. The above-described embodiment and the following modifications can be combined if the combined modifications remain technically consistent with each other.

The parts of the engagement portions 21 that are connected to the contact regions CR1, CR2 do not necessarily need to be inclined surfaces. If the engagement portions 21 are adjacent to the protectors 41, 42, movements of the protectors 41, 42 are restricted by the contact of the protectors 41, 42 with the side surfaces of the engagement portions 21. Thus, the engagement portions 21 restrict displacement of the protectors 41, 42.

The inclined surfaces do not necessarily need to be always in contact with the protectors 41, 42. If the engagement portions 21 are adjacent to the protectors 41, 42, movements of the protectors 41, 42 are restricted by the contact of the protectors 41, 42 with the side surfaces of the engagement portions 21. Thus, the engagement portions 21 restrict displacement of the protectors 41, 42.

The engagement portions 21 do not necessarily need to be arranged at opposite sides of each of the protectors 41, 42. Depending on the shapes of the protectors 41, 42, the shapes of the engagement portions 21, and the positions of the engagement portions 21, displacement of the protectors 41, 42 can be sufficiently restricted if the engagement portions 21 are each located at a position adjacent to a side surface of the protectors 41, 42.

The engagement portions 21 do not necessarily need to be arranged at positions adjacent to parts at which two side surfaces of the protectors 41, 42 are connected to each other.

The above-described embodiment illustrates the wire assembly 40 including the two protectors 41, 42, but the configuration of the wire assembly 40 is not limited to the one described in the above-described embodiment. The engine 100 may include a wire assembly including only a single protector. Further, the engine 100 may include a wire assembly having three or more protectors. The devices to which the wire harnesses 30 are connected are not limited to those described in the above-described embodiment.

In the above-described embodiment, an in-line four-cylinder engine is shown as an example of the engine 100. The engine 100 is not limited to an in-line four-cylinder engine. The engine 100 may be a three-cylinder engine. The engine 100 may be an engine that includes five or more cylinders. The engine 100 may be an engine including multiple cylinder banks.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An engine, comprising:
   a cylinder head;
   a wire assembly including multiple wire harnesses and a protector, the protector holding the wire harnesses such that the wire harnesses have shapes suitable to be routed;
   a sound absorber; and
   an engine cover that covers the wire assembly and the sound absorber arranged on the cylinder head, wherein
   the engine cover is attached to the cylinder head in a state in which the wire assembly and the sound absorber are held between the cylinder head and the engine cover to elastically deform the sound absorber,
   the protector is held in a state of being pressed against the cylinder head by a restoring force of the sound absorber,
   the sound absorber includes a contact region pressed against the protector,
   the sound absorber includes an engagement portion located at an edge of the contact region, the engagement portion being thicker than a thickness of the contact region, and
   the engagement portion is adjacent to a side surface of the protector.

2. The engine according to claim 1, wherein a part of the engagement portion that is connected to the contact region includes an inclined surface that is inclined such that a thickness of the connected part decreases toward the contact region.

3. The engine according to claim 2, wherein the inclined surface is in contact with the protector.

4. The engine according to claim 1, wherein the engagement portion includes multiple engagement portions that are located on opposite sides of the protector.

5. The engine according to claim 1, wherein
the protector includes two side surfaces connected to each other, and
the engagement portion is provided at a position adjacent to a part at which the two side surfaces are connected to each other.

\* \* \* \* \*